US 11,323,217 B2

(12) United States Patent
Hart et al.

(10) Patent No.: US 11,323,217 B2
(45) Date of Patent: May 3, 2022

(54) MULTI-BAND WIDTH TONE PLAN FOR OFDMA IN A WIRELESS NETWORK

(71) Applicant: Cisco Technology, Inc., San Jose, CA (US)

(72) Inventors: Brian Hart, Sunnyvale, CA (US); David Kloper, Santa Clara, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 68 days.

(21) Appl. No.: 16/804,428

(22) Filed: Feb. 28, 2020

(65) Prior Publication Data
US 2021/0067283 A1    Mar. 4, 2021

Related U.S. Application Data

(60) Provisional application No. 62/893,250, filed on Aug. 29, 2019.

(51) Int. Cl.
H04L 5/00         (2006.01)
H04W 72/04     (2009.01)

(52) U.S. Cl.
CPC .......... H04L 5/0007 (2013.01); H04L 5/0023 (2013.01); H04L 5/0044 (2013.01); H04L 5/0053 (2013.01); H04W 72/042 (2013.01); H04W 72/0453 (2013.01)

(58) Field of Classification Search
CPC . H04L 5/0092; H04L 27/2602; H04L 5/0053; H04L 5/0007; H04L 5/0023; H04L 5/0044; H04L 5/0037; H04W 72/042; H04W 84/12
See application file for complete search history.

(56) References Cited

U.S. PATENT DOCUMENTS 9,525,522 B2    12/2016   Yang et al.
9,717,086 B2     7/2017   Zhang et al.
9,844,028 B2    12/2017   Yang et al.
9,949,262 B2     4/2018   Chen et al.
10,009,894 B2    6/2018   Zhang et al.
(Continued)

FOREIGN PATENT DOCUMENTS

WO    2017003229 A1    1/2017

OTHER PUBLICATIONS

Brian Hart (Cisco Systems), "Revisit Tone Plan", vol. 802.11, No. 1, XP068154055, Sep. 20, 2019, 12 pages.
(Continued)

Primary Examiner — Maharishi V Khirodhar
Assistant Examiner — Kenneth P Hunt
(74) Attorney, Agent, or Firm — Edell, Shapiro & Finnan, LLC

(57) ABSTRACT

Presented herein is a tone plan that can accommodate multiple bandwidth options. This tone plan may be designed around a fundamental tile, such as 20 MHz tile, that is replicated to 40 and 80 MHz (and 160 MHz and beyond). For wider bandwidths, the otherwise-unused guard tones between the 20 MHz tiles are filled by a new resource unit and DC tones. There are DC tones placed to support any client, for all defined and plausible future values of its current operating bandwidth and center frequency (i.e. any 20 MHz, any 40 MHz, any 80 MHz, 160 MHz and 80+80 MHz, 320, 160+80 etc.), as well as plausible future preamble puncturing cases.

20 Claims, 6 Drawing Sheets

(56) References Cited

U.S. PATENT DOCUMENTS

| | | | |
|---|---|---|---|
| 10,028,284 B2 | 7/2018 | Chen et al. | |
| 10,050,750 B2 | 8/2018 | Yang et al. | |
| 10,149,292 B2 | 12/2018 | Yang et al. | |
| 10,154,476 B2 | 12/2018 | Yang et al. | |
| 10,172,137 B1* | 1/2019 | Hedayat | H04W 74/02 |
| 10,200,175 B2 | 2/2019 | Park et al. | |
| 10,397,914 B2 | 8/2019 | Bharadwaj et al. | |
| 2005/0036469 A1* | 2/2005 | Wentink | H04W 52/0216 |
| | | | 370/338 |
| 2013/0128867 A1* | 5/2013 | Calcev | H04L 69/323 |
| | | | 370/336 |
| 2015/0003367 A1* | 1/2015 | Seok | H04W 74/006 |
| | | | 370/329 |
| 2015/0016435 A1* | 1/2015 | Hedayat | H04W 74/02 |
| | | | 370/338 |
| 2015/0358995 A1* | 12/2015 | Li | H04L 5/0007 |
| | | | 370/329 |
| 2016/0080043 A1* | 3/2016 | Tian | H04L 5/0044 |
| | | | 375/267 |
| 2016/0030220 A1 | 10/2016 | Yang et al. | |
| 2017/0208546 A1* | 7/2017 | Park | H04W 72/042 |
| 2018/0227950 A1* | 8/2018 | Iwai | H04W 72/02 |
| 2019/0260531 A1* | 8/2019 | Chen | H04W 72/0453 |
| 2019/0313453 A1* | 10/2019 | Baron | H04W 56/0005 |

OTHER PUBLICATIONS

International Search Report and Written Opinion in counterpart International Application No. PCT/US2020/047306, dated Nov. 23, 2020, 21 pages.

* cited by examiner

| RU / nUsedTones | nDataTones | nPilotTones | Reuses existing blocks? | Efficiency with respect to 80M 11ax STAs in 80M BSS | Efficiency with respect to 20M 11ax STAs in 80M BSS |
|---|---|---|---|---|---|
| RU18 | 16 | 2 | N | N/A | N/A |
| RU26 | 26 (or 24) | 2 (or 4) | N (or Y) | 99.1% | 122.2% |
| RU56 | 52 | 4 | Y | 99.1% | 131% |
| RU114 | 108 | 6 | Y | 97.4% | 149% |
| RU230 | 222 | 8 | N | 97.5% | 100% |
| RU484 | 468 | 16 | Y | 99.2% | 101.7% |
| RU996 | 980 | 16 | Y | 100% | 100% |

FIG.3

MULTI-BAND WIDTH TONE PLAN FOR OFDMA IN A WIRELESS NETWORK

PRIORITY CLAIM

This application claims priority to U.S. Provisional Application No. 62/893,250, filed Aug. 29, 2019, the entirety of which is incorporated herein by reference.

TECHNICAL FIELD

The present disclosure relates to wireless communications and wireless networks.

BACKGROUND

In wireless networks, such as wireless local area networks (WLANs) that use the IEEE 802.11 standard, there is an increasing push to increase throughput and spectral efficiency. The peak theoretical throughput can be achieved regularly in low-density enterprise environments. However, when the client density (and resulting access-point density) increases, achieving these throughputs is more challenging because channel contention or air-time usage increases from client usage.

IEEE 802.11ax introduces the use of Orthogonal Frequency Division Multiple Access (OFDMA) within its physical layer and operating under a Carrier Sense Multiple Access/Collision Avoidance (CSMA/CA) channel access mechanism. This combination of physical layer and medium access sublayer is distinct from the usage of OFDMA in cellular/Long Term Evolution (LTE) radio networks, because it maintains its robustness in unlicensed spectrum. In particular, 802.11ax's use of OFDMA in a Physical Layer Conformance Procedure (PLCP) protocol data unit (PPDU) in a transmit opportunity (TXOP) assures, following the initial contention for the TXOP contention-free transmission to multiple clients in the downlink (DL) and/or uplink (UL). Moreover, the addition of multiuser Enhanced Distributed Channel Access (EDCA) to UL-OFDMA allows the access point to affect the relative channel access priorities of clients. Such 802.11ax schemes are not only more efficient and less prone to packet loss and jitter due to contention, but because they allow the access point to have precise control of both uplink and downlink transmissions, they also allow for greater determinism.

BRIEF DESCRIPTION OF THE DRAWINGS

FIG. 3 illustrates a summary of the features of the tone plan shown in FIGS. 1 and 2, according to an example embodiment.

DESCRIPTION OF EXAMPLE EMBODIMENTS

Overview

Figure 1:
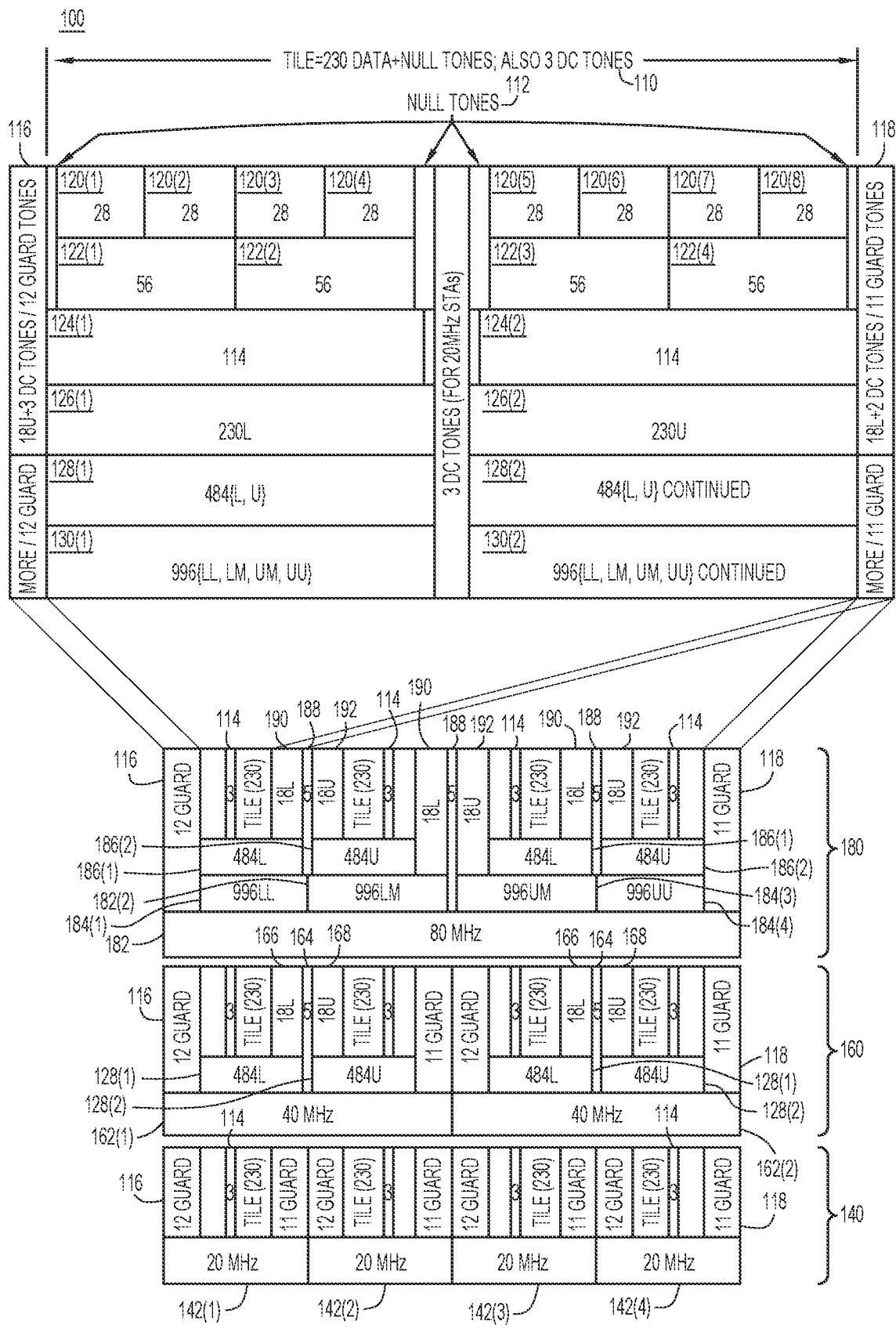
FIG. 1 is a diagram showing a tone plan according to an example embodiment.

In one embodiment, techniques are provided which are performed by a wireless access point device operating in a wireless network and serving one or more wireless client devices in the wireless network. A tone plan is defined for orthogonal frequency division multiple access (OFDMA) communication by the wireless access point device with the one or more wireless client devices. The tone plan includes: a fundamental tile for a channel of a predetermined bandwidth that is replicated across a frequency band and wherein multiples of the fundamental tile are bonded, on a selective basis, to form wider bandwidth channels across the frequency band; and DC tones at positions that repeat across the frequency band on a regular basis.

When sending a downlink transmission, the wireless access point device performs operations of: obtaining a request to transmit to the one or more wireless client devices a downlink multi-user data transmission containing a data unit having one or more space time streams within one or more resource units each consisting of a set of a number of tones within the tone plan; based on the request, transmitting to the one or more wireless client devices an indication of which one or more space time streams within which one or more resource units consisting of a set of a number of tones within the tone plan are assigned to respective ones of the one or more wireless client devices; and transmitting the downlink multi-user data transmission according to the indication of the one or more space time streams and the one or more resource units.

When receiving an uplink transmission, the wireless access point device performs operations of: obtaining a notification from within the wireless access point device that the wireless access point device should expect to receive, from the one or more wireless client devices, a superposition of uplink data transmissions that collectively form an uplink multi-user data transmission, the uplink data transmission from each wireless client device including a data unit that has one or more space time streams within a resource unit consisting of a set of a number of tones within the tone plan; receiving one or more data units in the uplink data transmissions, each data unit from an uplink data transmission sent by a respective one of the one or more wireless client devices and overlapping in time, and a preamble indicating that the uplink data transmissions should be in the superposition of uplink data transmissions forming the uplink multi-user data transmission; and obtaining the one or more data units in the uplink multi-user data transmission, according to the notification.

EXAMPLE EMBODIMENTS

The ability to allocate a resource unit (RU), defined as a set of contiguous (or essentially contiguous in the case that an RU is split by DC tones) OFDMA sub-carriers ("tones"), to each client or station (STA) in the same PPDU is first defined in the IEEE 802.11ax amendment of the 802.11 standard family. With the smallest resource unit being 26 tones (approximately 2 MHz) and the largest being 2×996 tones (160 MHz), there is a large degree of flexibility to balance aggregate (average) performance and peak throughput.

The IEEE 802.11ax tone plan for 20, 40 and 80 MHz PPDUs (and 160 MHz and 80+80 MHz as the duplication of the 80 MHz tone plan) is an efficiently designed tone plan for the cases when the PPDU occupies almost its entire bandwidth and each STA is operating at the same or a wider bandwidth than the PPDU. As a side-effect of the design, the relationship of the RU position to 20 MHz is fairly random in the sense that a) a small RU might be entirely inside a 20 MHz subchannel or overlap two 20 MHz subchannels, and b) tones are evacuated for local oscillator (LO) leakage (i.e., DC tones) only at the middle of the PPDU bandwidth.

However, there are several cases where the PPDU does not occupy almost its entire bandwidth and/or each STA is operating at a narrower bandwidth than the PPDU, due to such occasions as PPDUs with "preamble-puncturing", 20 MHz-only-STAs and situations where a STA can reduce its bandwidth for power savings. Each of these features interact poorly with the IEEE 802.11ax tone plan. When STAs operate at less than the PPDU bandwidth, there are many RUs which STAs cannot receive and may not be assigned, either because the RUs have data tones overlapping the STA's DC position or because the RUs are only partially inside the STA's operating bandwidth. In a poor case in an 80 MHz Basic Service Set (BSS), if every client device were a 20 MHz-only STA or operating in 20 MHz for power saving, even if every STA supported Selective Subchannel Transmission (i.e. could operate on any one of the 20 MHz subchannels within the 80 MHz), up to approximately 35% of the data tones would be unusable. In an uplink multi-user transmission, a STA's DC position may overlap an RU, making it impractical to allocate them to other users operating at the full bandwidth of the PPDU.

In a downlink or uplink multi-user transmission, an access point (AP) may choose to not populate certain sub-channels of its 80 or 160 MHz channel bandwidth if the AP finds the sub-channels busy. In the High Efficiency-Short Training Field (HE-STF), High Efficiency-Long Training Field (HE-LTF) and Data fields that are transmitted in HE format, this is performed by only assigning the free sub-channels to users. The Legacy Short Training Field (L-STF), Legacy Long Training Field (L-LTF), Legacy Signal (L-SIG), Repeated L-SIG (RL-SIG), and HE-SIG-B preamble fields are transmitted in a legacy mode (i.e., frequency-duplicated copies of an IEEE 802.11a/g or IEEE 802.11n modulated waveform employing 20 MHz, one spatial stream, binary convolutional coding (BCC), and a lower modulation coding scheme (MCS)) and utilize the technique known as "Preamble Puncturing" to not transmit these preamble fields in the corresponding 20 MHz sub-channels.

Specifically, certain RUs in the IEEE 802.11ax tone plan for a PPDU bandwidth are close to a band edge, close to a 20 MHz subchannel edge, or near the DC frequency of a STA operating at a lower bandwidth than the PPDU bandwidth. As a result, these RUs are unavailable to 20 MHz-only STAs, STAs reducing their bandwidth for power savings, and PPDUs with preamble-puncturing. In other words, it becomes difficult for a scheduler process running in an AP to allocate these RUs. As explained above, when these RUs are unallocated, there is an efficiency loss of up to approximately 35%.

Thus, IEEE 802.11a/g/n/ac/ax specifications are based on 20 MHz channels but the current IEEE 802.11ax tone plan is really three distinct tone plans individually optimized for 20 MHz channels, 40 MHz channels and 80 MHz channels, and the latter two somewhat ignored 20 MHz boundaries. It has since been discovered that 20 MHz boundaries do matter. Clients may go into power-save mode and drop to 40 or 20 MHz. Some APs may want to transmit a 160 MHz PPDU for several clients and still include clients that are operating at 40 MHz or 20 MHz. There may be other devices in the same spectrum transmitting on 20 MHz or 40 MHz. There is a desire to transmit PPDU's that are a multiple of 20 MHz but still be able to support devices operating on smaller bandwidths or just do not transmit on certain 20 MHz chunks of bandwidth.

When operating at, for example, 20 MHz, when the client receives the signal from the antenna, the receive electronics will add energy/signal at DC, and that would interfere with any energy received over-the-air around DC in the spectrum. In a typical implementation, the receiver signal processing would suppress the energy around DC so, if the AP transmits a RU26 that includes the receiver's DC frequency, instead of receiving 26 good data tones, approximately 3-5 subcarriers will be lost to the receiver, which is taking a relatively large chunk out of the available subcarriers for RU26. A similar situation would occur for RU52.

In the current 802.11ax tone plans, there is a blank space defined in the very center of the tone plan that is for DC tones. There was an assumption with 802.11ax that most users would be operating at the PPDU bandwidth or wider and consequently will have the DC tones aligning with this blank space (or aligning with the guard tones outside the active tones of the PPDU). However, when operating at 20 MHz or 40 MHz, the receiver's DC tone appears in other locations in the tone plan, creating unusable subcarriers in the locations where their use is desirable.

Presented herein is a tone plan that can accommodate multiple bandwidth options. This tone plan is designed around a 20 MHz tile, that is replicated to 40 and 80 MHz (and 160 MHz and beyond). For wider bandwidths, the otherwise unused guard tones between the 20 MHz tiles are filled by a new resource unit and DC tones. There are DC tones placed to support any client, for all defined values of its current operating bandwidth and center frequency (i.e. any 20 MHz, any 40 MHz, any 80 MHz, 160 MHz, or 80+80 MHz), and for all possible combinations of preamble puncturing.

Reference is made now made to FIG. 1, which illustrates a streamlined tone plan useful for IEEE 802.11ax with a high degree of reuse, for different bandwidths. The tone plan is shown generally at reference numeral 100. The tone plan 100 is based on fundamental basic tile size, such as 20 MHz, that is replicated to multiples of that tile size, such as 40, 80, 160, 80+80 MHz and all other natural extensions such as but not limited to 320, 20+20, 20+40, 20+80, 20+160, 20+240, 20+320, 40+40, 40+80, 40+160, 40+240, 40+320, 80+160, 80+240, 80+320, 160+160, 160+240, 160+320, 240+240, 240+320, 320+320, and so forth (including other component bandwidths such as 60, 120, 480 or 640 MHz).

In FIG. 1, a tile of a fundamental size is shown at 110, and again, in one example, the fundamental size is 20 MHz, as an example. The tile 110 includes 230 data and null tones as well as 3 DC tones. The null tones are shown at 112. The DC tones are shown at 114 and occur or are repeated at a regular interval, such as every 10 MHz. Thus, the DC tones 114 are in the middle of the tile 110 and thus divide the tile 110. As shown at 116, there are 12 guard tones on the left side of the tile 110 and as shown at 118, there are 11 guard tones on the right side of the tile 110. The guard tones at 116 and 118 tones may be used (re-purposed) as tones for a RU, as described further below.

The tile 110 may be allocated to different size RUs in several ways, as shown in FIG. 1. For example, four RUs 120(1)-120(4) of 28 tones each may be allocated on the left side of the DC tones 114 and four RUs 120(5)-120(8) of 28 tones each may be allocated on the right side of the DC tones 114. Alternatively, four RUs 122(1), 122(2), 122(3) and 122(4) of 56 tones each may be allocated, two on each of the left side and right side of the DC tones 114. Further still, two RUs 124(1) and 124(2) of 114 tones each may be allocated on each of the left side and right side of the DC tones 114. As still a further option, one 230 tone RU may be allocated in a tile, where the lower half of the 230 tones (denoted 230L) shown at 126(1) is on the left side of the DC tones 114 and the upper half of the 230 tones (denoted 230U) shown at 126(2) is on the right side of the DC tones 114. As well, the allocation may mix and match non-overlapping RUs of different sizes, such as RUs 120(1)-120(4) of 28 tones each may be allocated on the left side of the DC tones 114 and RUs 122(3) and 122(4) of 56 tones may be allocated on the right side of the DC tones 114.

FIG. 1 also shows an extended (20 MHz) tile merges the guard tones 116 and/or guard tones 118 with an RU. That is, the lower and upper portions of a 484 tone RU may be distributed across a tile, divided by the DC tones 114, as shown at 128(1) and 128(2). Similarly, portions of a 996 tone RU may be spread across a tile, divided by the DC tones 114, as shown at 130(1) and 130(2).

FIG. 1 further shows how the tone plan 100 may be configured across 80 MHz of bandwidth. At 140, four separate 20 MHz channels are shown at 142(1), 142(2(, 142(3) and 142(4), each of which follow the configuration of tile 110 with guard tones 116 and guard tones 118 on the left and right sides, respectively, and DC tones 114 in the middle.

At 160, 20 MHz channels are bonded together to form two 40 MHz channels 162(1) and 162(2). A portion of each 40 MHz channel may be used to carry the lower tones of a 484 RU (484L) as shown at 128(1) and the upper tones of the 484 RU (484U) as shown at 128(2).

If an AP is operating on one of the smaller RUs, such as 230, 114, 56 or 28 tones, the tones between the two 20 MHz tiles (consisting of the 12 guard tones 116 and 11 guard tones 118, for a total of 23 tones) may be re-purposed to form an RU consisting of 18 non-contiguous tones, 9 tones to the left of the 5 DC tones 164 (shown as 18L) at reference numeral 166 and 9 tones to the right of the 5 DC tones 164 (shown at 18R) at reference numeral 168. In other words, any time there is a 20 MHz channel next to another 20 MHz, instead of the tones between those two channels being used as guard tones, those tones are used to form a small RU of 18 non-contiguous tones, call RU18, consisting of two sets of 9 tones, with 5 DC tones dividing or separating the two sets of 9 tones. These RU18 may be allocated to any STA whose operating bandwidth includes both 20 MHz tiles.

Similarly, at 180, four 20 MHz channels are bonded together to form one 80 MHz channel 182. A portion of the 80 MHz channel 182 may be used to carry a lower portion of a 996 tone RU (996LL) as shown at 184(1), a portion to carry a lower middle portion of the 996 tone RU (996LM) as shown at 184(2), a portion to carry an upper middle portion of the 996 tone RU (996UM) as shown at 184(3) and a portion to carry an upper portion of the 996 tone RU (996UU) as shown at 184(4). Moreover, similar to the 40 MHz channel configuration shown at 160, a portion of the 80 MHz channel 182 may be used to carry the lower tones of a 484 RU (484L) as shown at 186(1) and the upper tones of the 484 RU (484U) as shown at 186(2) in both 40 MHz halves of the 80 MHz channel 182. Further still, there is an 18 tone RU divided by 5 DC tones shown at 188, formed by 9 tones for 18L shown at 190 and 9 tones for 18U shown at 192.

As wider bandwidth channels are allocated, the tone plan of FIG. 1 allows for using larger RUs, but in a more resilient manner than the existing tone plan. By locating RU18 in the space otherwise allocated for guard tones, and ensuring that other RU allocations are confined to a 20 MHz tile, this tone plan is more compatible with 20 MHz and 40 MHz devices. In the existing tone plan for IEEE 802.11ax, there are various RUs which could not be used, or could be used but with degradation, because some other device was involved in a transmission.

Figure 2:
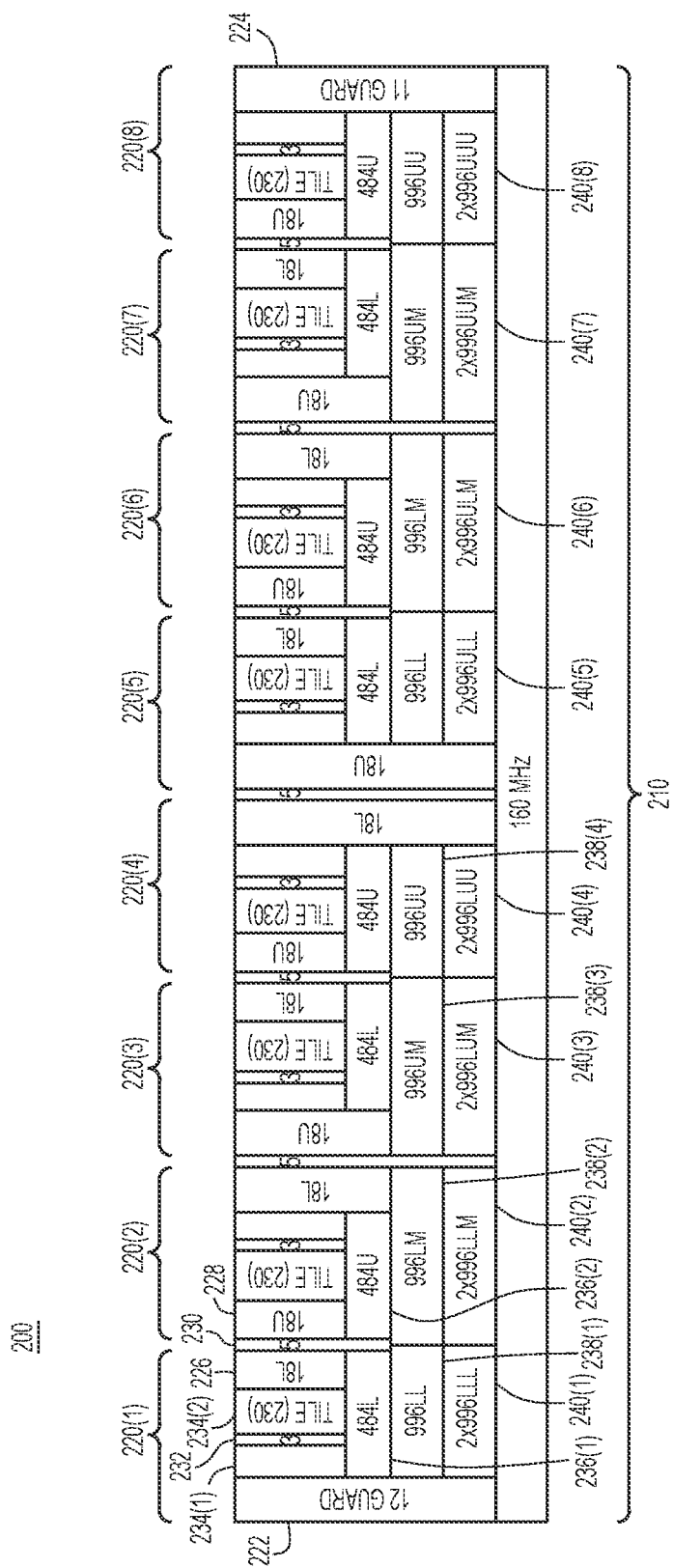
FIG. 2 is a diagram showing an extension of the tone plan of FIG. 1 for greater bandwidths, according to an example embodiment.

FIG. 2 illustrates an extension of the tone plan 100 of FIG. 1, wherein the narrower RU and tone plan of FIG. 1 is used for even wider bandwidths, such as 160 MHz, as an example. The same concepts could be applied to 320 MHz.

Specifically, the tone plan 200 of FIG. 2 includes one 160 MHz channel 210 that is composed of eight 20 MHz tiles 220(1)-220(8), similar to tile 110 shown in FIG. 1. Each tile 220(1) may be allocated to different size RU's in accordance with the techniques depicted in FIG. 1. For simplicity, the 12 guard tones on the left side of a tile, shown at 222 are shown as part of tile 220(1) and the 11 guard tones on the right side of a tile, shown at 224, are shown as part of tile 220(8). At the boundary between tiles, 9 tones, denoted 18L, are allocated for the lower portion of an 18 tone RU, as shown at 226, and 9 tones, denoted 18U, are allocated for the upper portion of the 18 tone RU, as shown at 228. Five DC tones 230 divide the 18L tones 226 and the 18U tones 228. In addition, three DC tones 232 are positioned at the 10 MHz point of each tile. Each tile may allocate tones for a 230 tone RU, as shown at 234(1) and 234(2).

Furthermore, each tile may allocate a portion of tones for a 484 tone RU, as shown at 236(1), where tile 220(1) is allocated for the lower 242 tones (denoted 484L) of a 484 tone RU, and at 236(2), tile 220(2) is allocated for the upper 242 tones (denoted 484U) of the 484 tone RU. Though not shown in FIG. 2, this pattern may repeat for tiles 220(3) and 220(4), tiles 220(5) and 220(6) and tiles 220(7) and 220(8).

Further still, a tile may be allocated for a portion of tones for a 996 tone RU. For example, tile 220(1) is used for a lower portion of a 996 RU (denoted 996LL) as shown at 238(1), tile 220(2) is used for a lower middle portion of the 996 RU (denoted 996LM) as shown at 238(2), tile 220(3) allocates an upper middle portion of the 996 RU (denoted 9961.1M) and tile 220(4) allocates an upper portion of the 996 RU (denoted 996UU) as shown at 238(4). Though not shown in FIG. 2, this pattern may repeat for tiles 220(5)-220(8), as shown in FIG. 2.

Further yet, each tile 220(1)-220(8) may be allocated for a portion of a 2×996-tone RU, which consists of two 996-tone segments, each located at each half of the PPDU bandwidth for 160 MHz and 80+80 MHz HE PPDU formats. If the 160 MHz is made up of eight 20 MHz portions identified by suffixes LLL, LLM, LUM, LUU, ULL, ULM, UUM and UUM, then tile 220(1) is used for the 2×996LLL portion of a 2×996-tone RU as shown at 240(1), tile 220(2) is used for the 2×996LLM portion of the 2×996-tone RU as shown at 240(2), tile 220(3) is used for the 2×996LUM portion of the 2×996-tone RU as shown at 240(3), tile 220(4) is used for the 2×996LUU portion of the 2×996-tone RU as shown at 240(4), tile 220(5) is used for the 2×996ULL portion of the 2×996-tone RU as shown at 240(5), tile 220(6) is used for the 2×996ULM portion of the 2×996-tone RU as shown at 240(6), tile 220(7) is used for the 2×996UUM portion of the 2×996-tone RU as shown at 240(7), and tile 220(8) is used for the 2×996UUU portion of the 2×996-tone RU as shown at 240(8).

In summary, as depicted in FIGS. 1 and 2, the tone plan presented herein includes DC tones every n*10 MHz, to support receivers (or segment receivers) with 20/40/80/160/80+80 MHz bandwidths, or more generally m*20 MHz for integer m (or m*20 MHz+n*20 MHz for integer m,n) with each receiver (or segment receiver) centered on any 20/40/80/160/80+80 MHz channel. The term "segment receiver" is introduced to describe that portion of a receiver associated with receiving a segment of a transmission that might be sent as one or more non-contiguous segments (e.g. 80+80 MHz has two segments). The number and position of the DC tones on a regularly occurring basis across a frequency band enables the simultaneous operation of bandwidth of 1×a fundamental tile size (e.g., 20 MHz), 2×the fundamental tile size (e.g., 40 MHz), 4×the fundamental tile size (e.g., 80 MHz), 8×the fundamental tile size (e.g., 160 MHz), and any integer multiple of the fundamental tile size in one segment. For example, an 80 M transmission would be: [10 dc 10 dc 10 dc 10 dc 10 dc 10] dc 10 dc 10.

Other bandwidths and channels are supported as well, with very modest restrictions on the receiver bandwidth and channel. Again, although this description refers to bandwidths and channels that are related 20 MHz, this is meant by way of example only. Other embodiments may involve applying a scaling factor before use (such as the scaling factors of 5/20 or 10/20 of 802.11y, 6/20, 7/20 or 8/20 of 802.11af TV White Space (TVWS) and 2/20 MHz of 11ah sub-1 GHz).

Furthermore, the tone plan presented herein allows for re-purposing guard tones for use as tones in a smaller size RU, e.g., RU18, when channel bonding occurs. This makes the tone plan more efficient by allowing RU18 to occupy otherwise-unused subcarriers between the 20 MHz tiles. This smaller size RU is not used at the band-edge, but it nevertheless provides room for 5 DC subcarriers between adjacent 20 MHz tiles for 40, 80, 160 MHz, etc., PPDUs.

The RU size may be selected to maximize commonality with existing RUs. This is possible for larger RUs but not all of the smaller RUs. As well, for 20 MHz PPDUs, the tone plan may instead follow the legacy tone plan (which has somewhat fewer edge tones) in order to maintain a higher spectral efficiency for this one case where there is no need for DC tones at other frequencies.

Moreover, the tone plan presented herein uses a fundamental tile (e.g., 20 MHz tile) that is repeated (copy/paste) for all bandwidths. The fundamental tile is exactly the same at exactly the same place for all bandwidths. Thus, the tone plan is symmetrical, whereas the current IEEE 802.11ax tone plan is not. In this tone plan, the different bandwidths have symmetry; there is no shuffling of tones to the left or right. The symmetry is maintained at each of the higher bandwidths.

FIG. 3 shows a table 300 listing advantages, for a typical case of an 80 MHz PPDU, of the tone plan depicted in FIGS. 1 and 2. The largest RUs are unchanged from the current IEEE 802.11ax tone plan or other RUs from the IEEE 802.11a/g/n/ac amendments in the sense that the number of data tones is unchanged. Often, the number of pilot tones is unchanged too. For the rare case of all STAs operating at 80 MHz, the efficiency of the tone plan is very similar to the IEEE 802.11ax tone plan. For a poor case of all STAs operating at 20 MHz, but able to be allocated to any 20 MHz subchannel, the tone plan is never worse and up to 49% more efficient than the current tone plan of IEEE 802.11ax.

This tone plan is very well matched to: 20 MHz-only STAs, STAs that reduce their bandwidth below the operating bandwidth of a basic service set for power saving reasons, and preamble-puncturing. This tone plan is efficient and compatible with all the IEEE 802.11 features. It is also consistent across PPDU bandwidths and reuses as many of the 802.11ax-defined RU sizes as possible.

In summary, this tone plan is much simpler than the current IEEE 802.11ax tone plan, due to its very high degree of consistency and symmetry. This tone plan is designed around a fundamental tile, e.g., a 20 MHz tile, that is replicated to 40 and 80 MHz (and 160 MHz and beyond). For the wider bandwidths, the otherwise unused guard tones between the 20 MHz tiles are filled by a new RU and DC tones. There are DC tones positioned to support any STA, for all defined (and plausible future) values of its current operating bandwidth and center frequency (i.e. any 20 MHz, any 40 MHz, any 80 MHz, 160 MHz or 80+80 MHz, 320 MHz, 160+80 MHz etc.).

Figure 4:
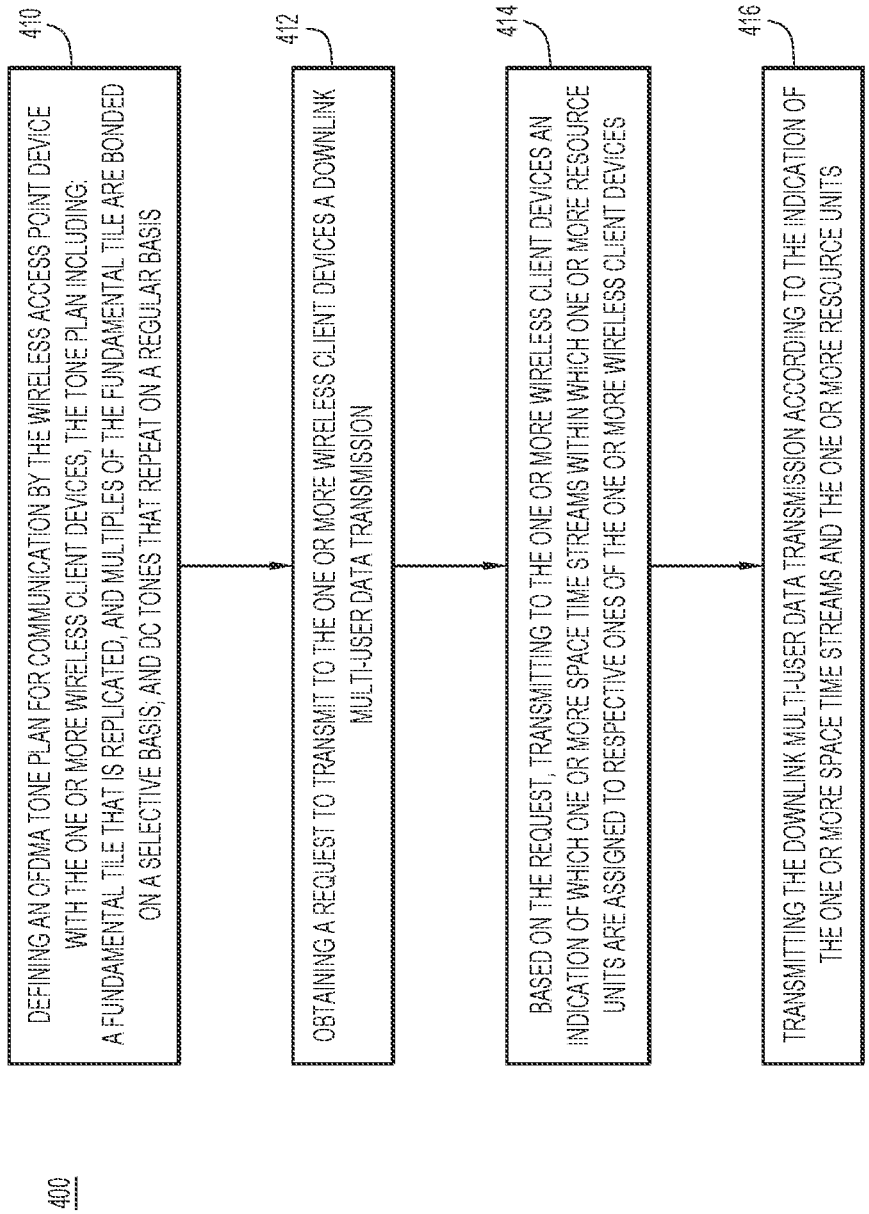
FIG. 4 is a flow chart of a method for using the tone plan during a downlink transmission, according to an example embodiment.

Turning now to FIG. 4, a flow chart is shown for a method 400 according to an example embodiment. The method 400 is performed by a wireless access point device operating in a wireless network and serving one or more wireless client devices in the wireless network. Moreover, the method 400 relates to when the wireless access point device is to transmit a downlink multi-user transmission.

The method includes, at 410, the wireless access point storing configuration information for defining a tone plan for orthogonal frequency division multiple access (OFDMA) communication by the wireless access point device with the one or more wireless client devices. The tone plan includes: a fundamental tile for a channel of a predetermined bandwidth that is replicated across a frequency band, and wherein multiples of the fundamental tile are bonded, on a selective basis, to form wider bandwidth channels across the frequency band; and DC tones at positions that repeat across the frequency band on a regular basis.

At 412, the method 400 includes obtaining a request to transmit to the one or more wireless client devices a downlink multi-user data transmission. The downlink multi-user data transmission contains a data unit having one or more space time streams within one or more resource units each consisting of a set of a number of tones within the tone plan. This operation may be performed by a physical (PHY) layer (the wireless transceiver and related modem functions) in the wireless access point device receiving from an upper layer (Media Access Control (MAC) or higher functional layers) a request to transmit a downlink multi-user PPDU to one or more wireless client devices.

At 414, based on the request, the wireless access point device transmits to the one or more wireless client devices an indication of which one or more space time streams within which one or more resource units consisting of a set of a number of tones within the tone plan are assigned to respective ones of the one or more wireless client devices. In one form, the indication transmitted in operation 414 is transmitted in a preamble. The operation 414 may be performed by the PHY of the wireless access point device.

At 416, the wireless access point device transmits the downlink multi-user data transmission according to the indication of the one or more space time streams and the one or more resource units. The operation 416 may be performed by the PHY of the wireless access point device.

Figure 5:
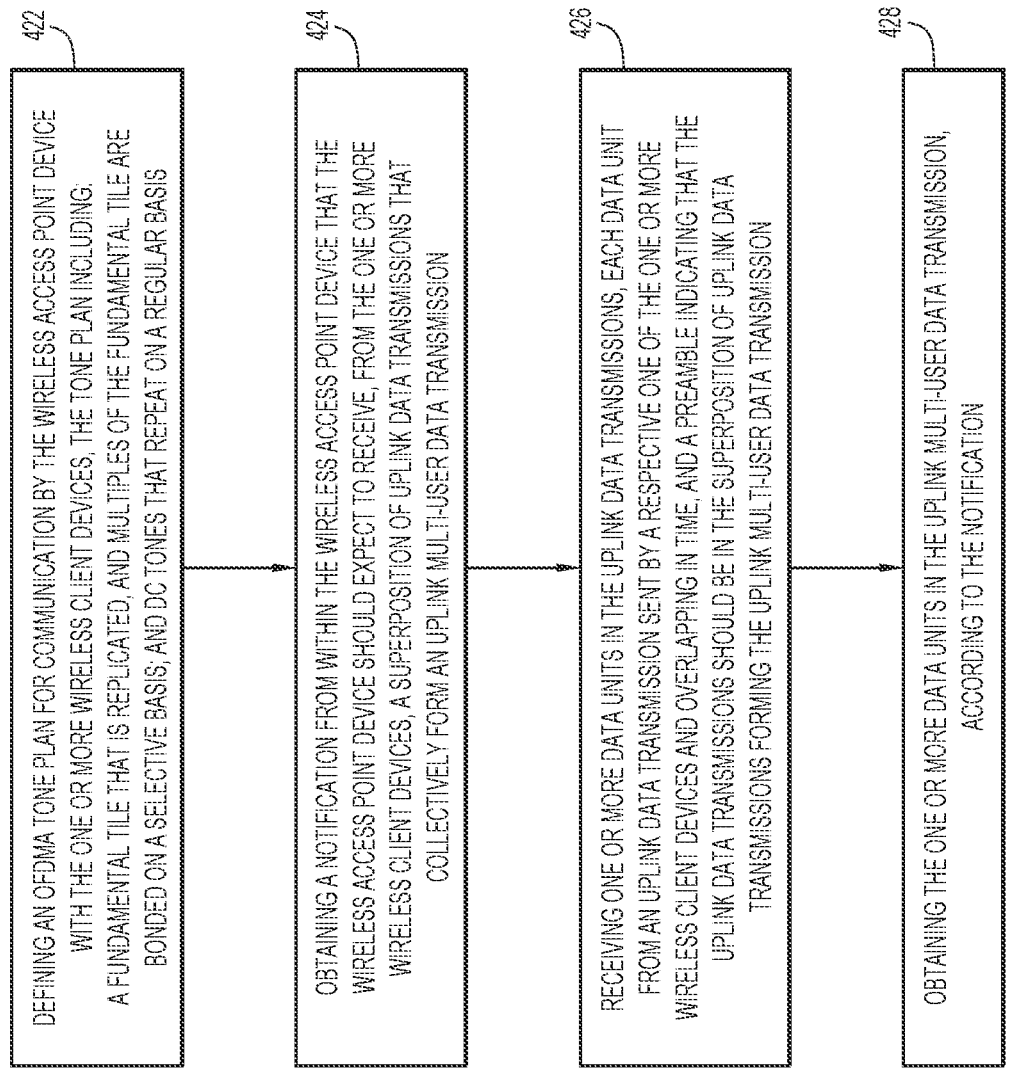
FIG. 5 is a flow chart of a method for using the tone plan during an uplink transmission, according to an example embodiment.

Reference is now made to FIG. 5. FIG. 5 shows a flow chart for a method 420 performed by a wireless access point device operating in a wireless network and serving one or more wireless client devices in the wireless network. The method 420 relates to when the wireless access point device is to receive an uplink multi-user transmission. At 422, the method involves the wireless access point storing configuration information for defining a tone plan for orthogonal frequency division multiple access (OFDMA) communication by the wireless access point device with the one or more wireless client devices. The tone plan includes: a fundamental tile for a channel of a predetermined bandwidth that is replicated across a frequency band, and wherein multiples of the fundamental tile are bonded, on a selective basis, to form wider bandwidth channels across the frequency band; and DC tones at positions that repeat across the frequency band on a regular basis.

At 424, the method involves the wireless access point device obtaining a notification from within the wireless access point device that the wireless access point device should expect to receive, from the one or more wireless client devices, a superposition of uplink data transmissions that collectively form an uplink multi-user data transmission. The uplink data transmission from each wireless client device includes a data unit that has one or more space time streams within a resource unit consisting of a set of a number of tones within the tone plan. The operation 424 may be performed by the PHY of the wireless access point device, and the notification may originate from an upper layer, MAC layer or above.

At 426, the method involves the wireless access point device receiving one or more data units in the uplink data transmissions, each data unit from an uplink data transmission sent by a respective one of the one or more wireless client devices and overlapping in time, and receiving a preamble indicating that the uplink data transmissions should be in the superposition of uplink data transmissions forming the uplink multi-user data transmission. The operation 426 may be performed by the PHY of the wireless access point device.

At 428, the method involves the wireless access point obtaining the one or more data units in the uplink multi-user data transmission, according to the notification. Operation 428 may be performed by the PHY of the wireless access point device, according to the notification received from an upper layer, e.g., MAC layer or above.

Thus, in the context of the method 420, the wireless access point device receives a superposition of many uplink data transmissions. Each client device sends an uplink data transmission, which may be referred to as a High Efficiency Trigger-Based (HE TB) PPDU in 802.11 parlance. Each uplink data transmission may include a data unit, called a "data field" in 802.11 parlance. The data unit follows the tone plan, and the data unit may comprise multiple resource units, which contain users with one or more spatial streams.

As described above in connection with FIGS. 1 and 2, in one embodiment, the predetermined bandwidth of the fundamental tile is 20 MHz, and the DC tones repeat across the frequency band every 10 MHz.

Furthermore, in one embodiment, guard tones associated with adjacent fundamental tiles are used as part of a non-contiguous resource unit when multiples of the fundamental tile are bonded together to form wider bandwidth channels. The non-contiguous resource unit may be separated or divided by a predetermined number of the DC tones such that a predetermined number of the guard tones are used as data tones of the non-contiguous resource unit are on a first side and a second side of the predetermined number of DC tones.

In one example, the non-contiguous resource unit consists of 18 tones, 9 tones on each of the first side and the second side of the predetermined number of DC tones, and the predetermined number of DC tones is 5.

In one embodiment, a size of the resource unit is one of 28 tones, 56 tones, 114 tones, 230 tones, 484 tones, 996 tones and larger.

As described above, the tone plan may be symmetrical with respect to the DC tones for the fundamental tile and for multiples of the fundamental tiles selectively bonded together.

The determining of which one or more space time streams within which one or more resource units are assigned to respective ones of the one or more wireless client devices is performed on a dynamic basis to satisfy one or more scheduling goals and offered loads for a number of the one or more wireless client devices the wireless access point device is serving and an operating bandwidth to be used in uplink and downlink for communication between the wireless access point device and the one or more wireless client devices. In one form, the operating bandwidth of the one or more wireless client devices may be different. Moreover, in one form, a center frequency used by the one or more wireless client devices may be different.

Furthermore, a legacy tone plan may be used for transmitting 20 MHz protocol data units and the tone plan defined in operation 410 may be used for transmitting protocol data units that are multiples of 20 MHz.

Figure 6:
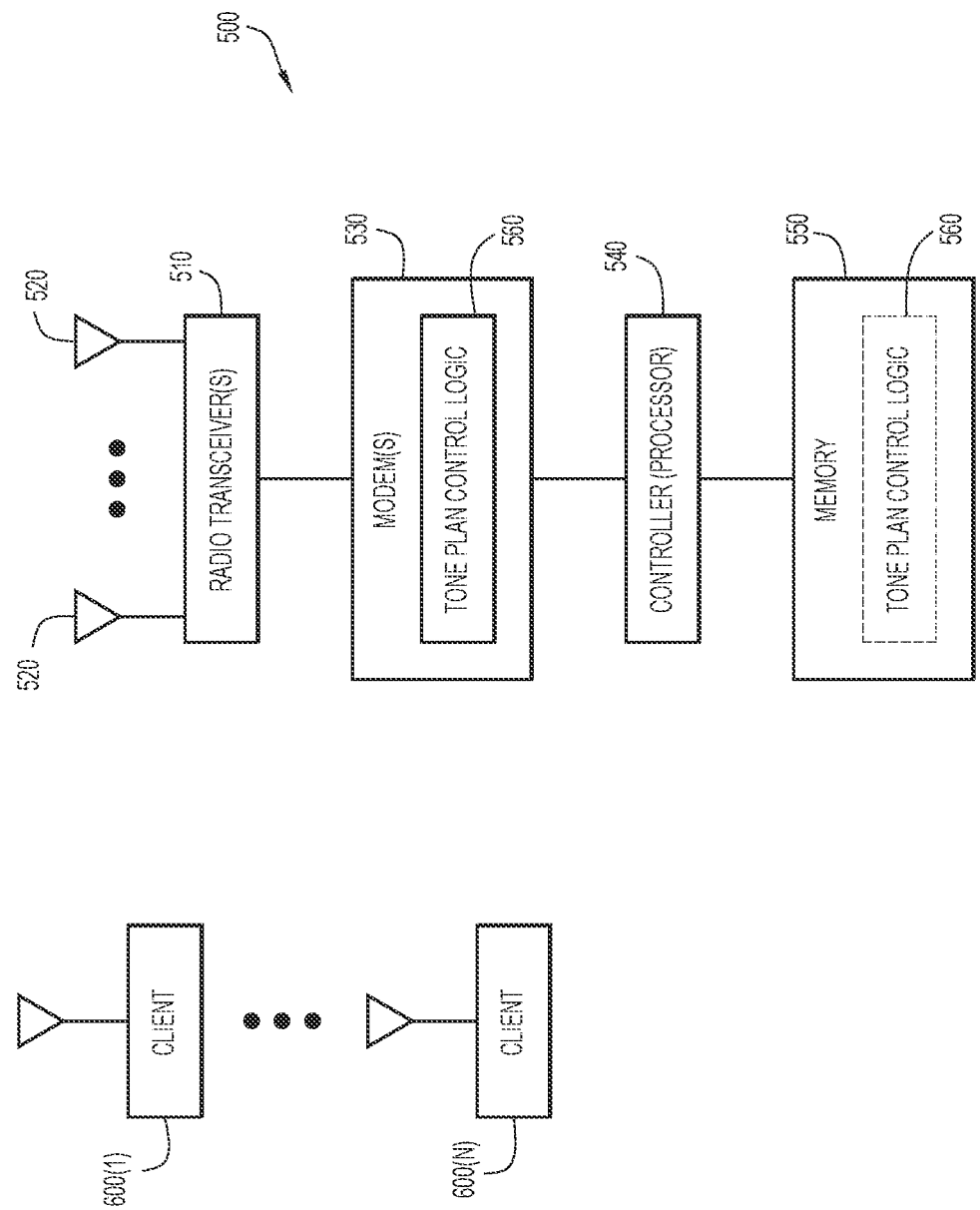
FIG. 6 is a block diagram of a wireless device configured to operate in accordance with the tone plan described herein, according to an example embodiment.

Reference is now made to FIG. 6. FIG. 6 shows a block diagram of a wireless device 500 (e.g., AP) configured to operate in accordance with the tone plan described here. In addition, FIG. 6 shows a plurality of client devices 600(1)-600(N) that are in wireless communication with the wireless device 500. The wireless device includes 500 includes a radio transceiver 510 (or multiple radio transceivers), one or more antennas 520, a modem 530 (or multiple modems), a controller (e.g., a microprocessor) 540 and memory 550. The modem 530 may be configured with tone plan control logic 560 (in a scheduler function) to control operation of the wireless device 500 in accordance with the tone plan described herein. Alternatively, the memory 550 may store software instructions for tone plan control logic 560 that, when executed by the controller 540, cause the controller 540 to execute the tone plan described herein on behalf of the wireless device 500.

The memory 550 may comprise read only memory (ROM), random access memory (RAM), magnetic disk storage media devices, optical storage media devices, flash memory devices, electrical, optical, or other physical/tangible memory storage devices. Thus, in general, the memory may comprise one or more tangible (non-transitory) computer readable storage media (e.g., a memory device) encoded with software comprising computer executable instructions and when the software is executed (by the controller 540) it is operable to perform the operations described herein.

In operation, each client is assigned an RU. The AP is responsible for breaking up the spectrum in the frequency domain into RUs, and then assigning each RU to one or more clients. On the downlink, the AP transmits to a client inside the assigned RU and the AP informs the client about which RU to use on the uplink. For example, the AP informs the client the RU assignment information in a trigger frame, including what RU to use, the offset index to indicate an offset from a left-most frequency subcarrier and how many spatial streams to use, modulation coding scheme (MCS), etc.

The AP performs this procedure so as to specify for a particular transmission in the downlink, that a particular client is assigned to a particular RU, and similarly for the uplink. The AP dynamically changes the RU and which RU is allocated to clients, limited by the operating bandwidth of the client and the AP. Clients act on this control information provided by the AP. Again, the AP operates under the constraints of the RUs and available RUs defined in the tone plan of the standard.

In the foregoing description, 20 MHz is only an example of the minimal bandwidth used by the fundamental tile. This assume the same number of subcarriers per 20 MHz, but this may be any number of subcarriers per some minimal/basic block of bandwidth (fundamental tile).

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In summary, in one form, a method is provided that is performed by a wireless access point device operating in a wireless network and serving one or more wireless client devices in the wireless network, the method comprising: defining a tone plan for orthogonal frequency division multiple access (OFDMA) communication by the wireless access point device with the one or more wireless client devices, the tone plan including: a fundamental tile for a channel of a predetermined bandwidth that is replicated across a frequency band and wherein multiples of the fundamental tile are bonded, on a selective basis, to form wider bandwidth channels across the frequency band; and DC tones at positions that repeat across the frequency band on a regular basis; obtaining a request to transmit to the one or more wireless client devices a downlink multi-user data transmission containing a data unit having one or more space time streams within one or more resource units each consisting of a set of a number of tones within the tone plan; based on the request, transmitting to the one or more wireless client devices an indication of which one or more space time streams within which one or more resource units consisting of a set of a number of tones within the tone plan are assigned to respective ones of the one or more wireless client devices; and transmitting the downlink multi-user data transmission according to the indication of the one or more space time streams and the one or more resource units.

In another form, an apparatus is provided comprising: one or more radio transceivers configured to wirelessly transmit and wirelessly receive signals in a frequency band; one or more modems coupled to the one or more radio transceivers, wherein the one or more modems are configured to perform baseband modulation and demodulation; and a controller coupled to the one or more modems; wherein the controller or the one or more modems are configured to perform operations for serving one or more wireless client devices in a wireless network, the operations including: storing information defining a tone plan for orthogonal frequency division multiple access (OFDMA) communication with the one or more wireless client devices, the tone plan including: a fundamental tile for a channel of a predetermined bandwidth that is replicated across a frequency band and wherein multiples of the fundamental tile are bonded, on a selective basis, to form wider bandwidth channels across the frequency band; and DC tones at positions that repeat across the frequency band on a regular basis; obtaining a request to transmit to the one or more wireless client devices a downlink multi-user data transmission containing a data unit having one or more space time streams within one or more resource units each consisting of a set of a number of tones within the tone plan; based on the request, causing the one or more radio transceivers to transmit to the one or more wireless client devices an indication of which one or more space time streams within which one or more resource units consisting of a set of a number of tones within the tone plan are assigned to respective ones of the one or more wireless client devices; and causing the one or more radio transceivers to transmit the downlink multi-user data transmission according to the indication of the one or more space time streams and the one or more resource units.

In still another form, one or more non-transitory computer readable storage media are provided, encoded with instructions that, when executed by a processor of a wireless access point device operating in a wireless network and serving one or more wireless client devices in the wireless network, cause the wireless access point device to perform operations including: defining a tone plan for orthogonal frequency division multiple access (OFDMA) communication by the wireless access point device with the one or more wireless client devices, the tone plan including: a fundamental tile for a channel of a predetermined bandwidth that is replicated across a frequency band and wherein multiples of the fundamental tile are bonded, on a selective basis, to form wider bandwidth channels across the frequency band; and DC tones at positions that repeat across the frequency band on a regular basis; obtaining a request to transmit to the one or more wireless client devices a downlink multi-user data transmission containing a data unit having one or more space time streams within one or more resource units each consisting of a set of a number of tones within the tone plan; based on the request, transmitting to the one or more wireless client devices an indication of which one or more space time streams within which one or more resource units consisting of a set of a number of tones within the tone plan are assigned to respective ones of the one or more wireless client devices; and transmitting the downlink multi-user data transmission according to the indication of the one or more space time streams and the one or more resource units.

In another form, a method is provided that is performed by a wireless access point device operating in a wireless network and serving one or more wireless client devices in the wireless network, the method comprising: defining a tone plan for orthogonal frequency division multiple access (OFDMA) communication by the wireless access point device with the one or more wireless client devices, the tone plan including: a fundamental tile for a channel of a predetermined bandwidth that is replicated across a frequency band and wherein multiples of the fundamental tile are bonded, on a selective basis, to form wider bandwidth channels across the frequency band; and DC tones at positions that repeat across the frequency band on a regular basis; obtaining a notification from within the wireless access point device that the wireless access point device should expect to receive, from the one or more wireless client devices, a superposition of uplink data transmissions that collectively form an uplink multi-user data transmission, the uplink data transmission from each wireless client device including a data unit that has one or more space time streams within a resource unit consisting of a set of a number of tones within the tone plan; receiving one or more data units in the uplink data transmissions, each data unit from an uplink data transmission sent by a respective one of the one or more wireless client devices and overlapping in time, and a preamble indicating that the uplink data transmissions should be in the superposition of uplink data transmissions forming the uplink multi-user data transmission; and obtaining the one or more data units in the uplink multi-user data transmission, according to the notification.

In another form, an apparatus is provided comprising: one or more radio transceivers configured to wirelessly transmit and wirelessly receive signals in a frequency band; one or more modems coupled to the one or more radio transceivers, wherein the one or more modems are configured to perform baseband modulation and demodulation; and a controller coupled to the one or more modems; wherein the controller or the one or more modems are configured to perform operations for serving one or more wireless client devices in a wireless network, the operations including: defining a tone plan for orthogonal frequency division multiple access (OFDMA) communication by the wireless access point device with the one or more wireless client devices, the tone plan including: a fundamental tile for a channel of a predetermined bandwidth that is replicated across a frequency band and wherein multiples of the fundamental tile are bonded, on a selective basis, to form wider bandwidth channels across the frequency band; and DC tones at positions that repeat across the frequency band on a regular basis; obtaining a notification from within the wireless access point device that the wireless access point device should expect to receive, from the one or more wireless client devices, a superposition of uplink data transmissions that collectively form an uplink multi-user data transmission, the uplink data transmission from each wireless client device including a data unit that has one or more space time streams within a resource unit consisting of a set of a number of tones within the tone plan; receiving one or more data units in the uplink data transmissions, each data unit from an uplink data transmission sent by a respective one of the one or more wireless client devices and overlapping in time, and a preamble indicating that the uplink data transmissions should be in the superposition of uplink data transmissions forming the uplink multi-user data transmission; and obtaining the one or more data units in the uplink multi-user data transmission, according to the notification.

In still another form, one or more non-transitory computer readable storage media are provided, encoded with instructions that, when executed by a processor of a wireless access point device operating in a wireless network and serving one or more wireless client devices in the wireless network, cause the wireless access point device to perform operations including: defining a tone plan for orthogonal frequency division multiple access (OFDMA) communication by the wireless access point device with the one or more wireless client devices, the tone plan including: a fundamental tile for a channel of a predetermined bandwidth that is replicated across a frequency band and wherein multiples of the fundamental tile are bonded, on a selective basis, to form wider bandwidth channels across the frequency band; and DC tones at positions that repeat across the frequency band on a regular basis; obtaining a notification from within the wireless access point device that the wireless access point device should expect to receive, from the one or more wireless client devices, a superposition of uplink data transmissions that collectively form an uplink multi-user data transmission, the uplink data transmission from each wireless client device including a data unit that has one or more space time streams within a resource unit consisting of a set of a number of tones within the tone plan; receiving one or more data units in the uplink data transmissions, each data unit from an uplink data transmission sent by a respective one of the one or more wireless client devices and overlapping in time, and a preamble indicating that the uplink data transmissions should be in the superposition of uplink data transmissions forming the uplink multi-user data transmission; and obtaining the one or more data units in the uplink multi-user data transmission, according to the notification.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method performed by a wireless access point device operating in a wireless network and serving one or more wireless client devices in the wireless network, the method comprising:
    defining a tone plan for orthogonal frequency division multiple access (OFDMA) communication by the wireless access point device with the one or more wireless client devices, the tone plan including:
        a fundamental tile for a channel of a predetermined bandwidth that is replicated across a frequency band and wherein multiples of the fundamental tile are bonded, on a selective basis, to form wider bandwidth channels across the frequency band, wherein guard tones associated with adjacent fundamental tiles are allocated as part of a non-contiguous resource unit when multiples of the fundamental tile are bonded together to form wider bandwidth channels; and
        DC tones at positions that repeat across the frequency band on a regular basis;
    obtaining a request to transmit to the one or more wireless client devices a downlink multi-user data transmission containing a data unit having one or more space time streams within one or more resource units each consisting of a set of a number of tones within the tone plan;
    based on the request, transmitting to the one or more wireless client devices an indication of which one or more space time streams within which one or more resource units consisting of a set of a number of tones within the tone plan are assigned to respective ones of the one or more wireless client devices; and
    transmitting the downlink multi-user data transmission according to the indication of the one or more space time streams and the one or more resource units.

2. The method of claim 1, wherein the predetermined bandwidth of the fundamental tile is 20 MHz, and the DC tones repeat across the frequency band every 10 MHz.

3. The method of claim 1, wherein the non-contiguous resource unit is divided by a predetermined number of DC tones such that a predetermined number of the guard tones that are used as data tones of the non-contiguous resource unit are on a first side and a second side of the predetermined number of DC tones.

4. The method of claim 3, wherein the non-contiguous resource unit consists of 18 tones, 9 tones on each of the first side and the second side of the predetermined number of DC tones, and the predetermined number of DC tones is 5.

5. The method of claim 4, wherein a size of the non-contiguous resource unit is one of 28 tones, 56 tones, 114 tones, 230 tones, 484 tones, 996 tones and larger.

6. The method of claim 1, wherein the tone plan is symmetrical with respect to the DC tones for the fundamental tile and for multiples of the fundamental tile selectively bonded together.

7. The method of claim 1, wherein the indication is transmitted in a preamble.

8. The method of claim 1, wherein a legacy tone plan is used for transmitting 20 MHz protocol data units and the tone plan is used for transmitting protocol data units that are multiples of 20 MHz.

9. A method performed by a wireless access point device operating in a wireless network and serving one or more wireless client devices in the wireless network, the method comprising:
- defining a tone plan for orthogonal frequency division multiple access (OFDMA) communication by the wireless access point device with the one or more wireless client devices, the tone plan including:
  - a fundamental tile for a channel of a predetermined bandwidth that is replicated across a frequency band and wherein multiples of the fundamental tile are bonded, on a selective basis, to form wider bandwidth channels across the frequency band, wherein guard tones associated with adjacent fundamental tiles are allocated as part of a non-contiguous resource unit when multiples of the fundamental tile are bonded together to form wider bandwidth channels; and
  - DC tones at positions that repeat across the frequency band on a regular basis;
- obtaining a notification from within the wireless access point device that the wireless access point device should expect to receive, from the one or more wireless client devices, a superposition of uplink data transmissions that collectively form an uplink multi-user data transmission, the uplink data transmission from each wireless client device including a data unit that has one or more space time streams within a resource unit consisting of a set of a number of tones within the tone plan;
- receiving one or more data units in the uplink data transmissions, each data unit from an uplink data transmission sent by a respective one of the one or more wireless client devices and overlapping in time, and a preamble indicating that the uplink data transmissions should be in the superposition of uplink data transmissions forming the uplink multi-user data transmission; and
- obtaining the one or more data units in the uplink multi-user data transmission, according to the notification.

10. The method of claim 9, wherein the predetermined bandwidth of the fundamental tile is 20 MHz, and the DC tones repeat across the frequency band every 10 MHz.

11. The method of claim 9, wherein the non-contiguous resource unit is divided by a predetermined number of DC tones such that a predetermined number of the guard tones that are used as data tones of the non-contiguous resource unit are on a first side and a second side of the predetermined number of DC tones.

12. The method of claim 11, wherein the non-contiguous resource unit consists of 18 tones, 9 tones on each of the first side and the second side of the predetermined number of DC tones, and the predetermined number of DC tones is 5.

13. The method of claim 12, wherein a size of the non-contiguous resource unit is one of 28 tones, 56 tones, 114 tones, 230 tones, 484 tones, 996 tones and larger.

14. The method of claim 9, wherein the tone plan is symmetrical with respect to the DC tones for the fundamental tile and for multiples of the fundamental tile selectively bonded together.

15. The method of claim 9, wherein a legacy tone plan is used for transmitting 20 MHz protocol data units and the tone plan is used for transmitting protocol data units that are multiples of 20 MHz.

16. An apparatus comprising:
- one or more radio transceivers configured to wirelessly transmit and wirelessly receive signals in a frequency band;
- one or more modems coupled to the one or more radio transceivers, wherein the one or more modems are configured to perform baseband modulation and demodulation; and
- a controller coupled to the one or more modems;
- wherein the controller or the one or more modems are configured to perform operations for serving one or more wireless client devices in a wireless network, the operations including:
  - storing information defining a tone plan for orthogonal frequency division multiple access (OFDMA) communication with the one or more wireless client devices, the tone plan including:
    - a fundamental tile for a channel of a predetermined bandwidth that is replicated across a frequency band and wherein multiples of the fundamental tile are bonded, on a selective basis, to form wider bandwidth channels across the frequency band, wherein guard tones associated with adjacent fundamental tiles are used as part of a non-contiguous resource unit when multiples of the fundamental tile are bonded together to form wider bandwidth channels; and
    - DC tones at positions that repeat across the frequency band on a regular basis;
  - obtaining a request to transmit to the one or more wireless client devices a downlink multi-user data transmission containing a data unit having one or more space time streams within one or more resource units each consisting of a set of a number of tones within the tone plan;
  - based on the request, causing the one or more radio transceivers to transmit to the one or more wireless client devices an indication of which one or more space time streams within which one or more resource units consisting of a set of a number of tones within the tone plan are assigned to respective ones of the one or more wireless client devices; and
  - causing the one or more radio transceivers to transmit the downlink multi-user data transmission according to the indication of the one or more space time streams and the one or more resource units.

17. The apparatus of claim 16, wherein the predetermined bandwidth of the fundamental tile is 20 MHz, and the DC tones repeat across the frequency band every 10 MHz.

18. The apparatus of claim 16, wherein the non-contiguous resource unit is divided by a predetermined number of DC tones such that a predetermined number of the guard tones are used as data tones of the non-contiguous resource unit are on a first side and a second side of the predetermined number of DC tones.

19. The apparatus of claim 18, wherein the non-contiguous resource unit consists of 18 tones, 9 tones on each of the first side and the second side of the predetermined number of DC tones, and the predetermined number of DC tones is 5.

20. The apparatus of claim 19, wherein a size of the non-contiguous resource unit is one of 18 tones, 28 tones, 56 tones, 230 tones, 484 tones, 996 tones and larger.

* * * * *

UNITED STATES PATENT AND TRADEMARK OFFICE
CERTIFICATE OF CORRECTION

| | | |
|---|---|---|
| PATENT NO. | : 11,323,217 B2 | Page 1 of 1 |
| APPLICATION NO. | : 16/804428 | |
| DATED | : May 3, 2022 | |
| INVENTOR(S) | : Brian Hart et al. | |

It is certified that error appears in the above-identified patent and that said Letters Patent is hereby corrected as shown below:

On the Title Page

Item (54) and in the Specification, Column 1, Lines 1-2, Title:
Please replace "MULTI-BAND WIDTH TONE PLAN FOR OFDMA IN A WIRELESS NETWORK" with --MULTI-BANDWIDTH TONE PLAN FOR OFDMA IN A WIRELESS NETWORK--

Signed and Sealed this
Eighteenth Day of October, 2022

Katherine Kelly Vidal
*Director of the United States Patent and Trademark Office*